United States Patent
Morimoto et al.

[11] Patent Number: 6,140,732
[45] Date of Patent: Oct. 31, 2000

[54] ARMATURE COIL CONDUCTOR AND METHOD OF MANUFACTURE THEREFOR

[75] Inventors: Yoshihiro Morimoto; Yoshiharu Yamada, both of Tokyo, Japan

[73] Assignee: Mitsubishi Denki Kabushiki Kaisha, Tokyo, Japan

[21] Appl. No.: 09/138,070

[22] Filed: Aug. 21, 1998

[30] Foreign Application Priority Data

Apr. 8, 1998 [JP] Japan .................................. 10-096327

[51] Int. Cl.$^7$ .................................................. H02K 1/00
[52] U.S. Cl. ............................ 310/195; 310/261; 29/597
[58] Field of Search .................................. 310/195, 261, 310/234; 29/597, 598

[56] References Cited

U.S. PATENT DOCUMENTS

| | | | |
|---|---|---|---|
| 3,911,563 | 10/1975 | Anderson | 29/597 |
| 4,369,910 | 1/1983 | Hamano et al. | 220/110.1 |
| 4,401,252 | 8/1983 | Hamano et al. | 228/110.1 |
| 4,402,130 | 9/1983 | Tsuruoka et al. | 29/597 |
| 4,437,230 | 3/1984 | Greutmann | 29/597 |
| 4,625,242 | 11/1986 | Baumberg | 348/206 |
| 4,670,971 | 6/1987 | Allen et al. | 29/597 |
| 4,757,601 | 7/1988 | Leech et al. | 29/597 |
| 4,833,769 | 5/1989 | Tomite et al. | 29/597 |
| 4,933,587 | 6/1990 | Tanaka et al. | 310/233 |
| 5,191,250 | 3/1993 | Kobayashi | 310/261 |
| 5,619,088 | 4/1997 | Yumiyama et al. | 310/270 |
| 5,778,512 | 7/1998 | Ichikawa et al. | 29/598 |
| 5,864,193 | 1/1999 | Katoh | 310/214 |

FOREIGN PATENT DOCUMENTS

| | | |
|---|---|---|
| 2511102 | 9/1975 | Germany . |
| 355147950A | 11/1980 | Japan . |
| 355147951A | 11/1980 | Japan . |
| 355147952A | 11/1980 | Japan . |
| 356129555A | 10/1981 | Japan . |
| 357009242 | 1/1982 | Japan . |
| 58-66846 | 5/1983 | Japan . |
| 60229649 | 4/1984 | Japan . |

*Primary Examiner*—Nestor Ramirez
*Assistant Examiner*—Joseph Waks
*Attorney, Agent, or Firm*—Sughrue, Mion, Zinn, Macpeak & Seas, PLLC

[57] ABSTRACT

The lead portions have oval cross sections such that the dimensions of the cross sections of the lead portions parallel to the circumference of the armature are smaller than those of the straight portions parallel to the circumference of the armature are. Preferably, the cross-sectional area of the lead portions may be substantially equal to that of the straight portions. The lead portions may have circular cross sections such that the cross-sectional diameter of the lead portions is smaller than that of the straight portions. The method of manufacture for an armature coil conductor comprises the steps of working, which may be ironing preferably, the ends of the straight portions so that the lead portions have oval cross sections. Preferably, the working performed on the ends of the straight portions may comprise inserting a plurality of the straight portions into the slots in the armature core; overlapping a plurality of the lead portions and forming pairs of lead portions comprising an upper lead and a lower lead; and simultaneously ironing the pairs of lead portions by passing the pairs of lead portions through a die having a plurality of die holes capable of ironing the pairs of lead portions simultaneously.

17 Claims, 13 Drawing Sheets

PRIOR ART

FIG. 11

PRIOR ART

FIG. 12

PRIOR ART

PRIOR ART

F I G. 15

PRIOR ART

F I G. 16

PRIOR ART

FIG. 17

PRIOR ART

FIG. 18

ARMATURE COIL CONDUCTOR AND METHOD OF MANUFACTURE THEREFOR

BACKGROUND OF THE INVENTION

This invention relates to an armature coil conductor to be connected to a commutator segment by ultrasonic welding for use in a direct-current motor, and a method of manufacture therefor.

Figure 11:
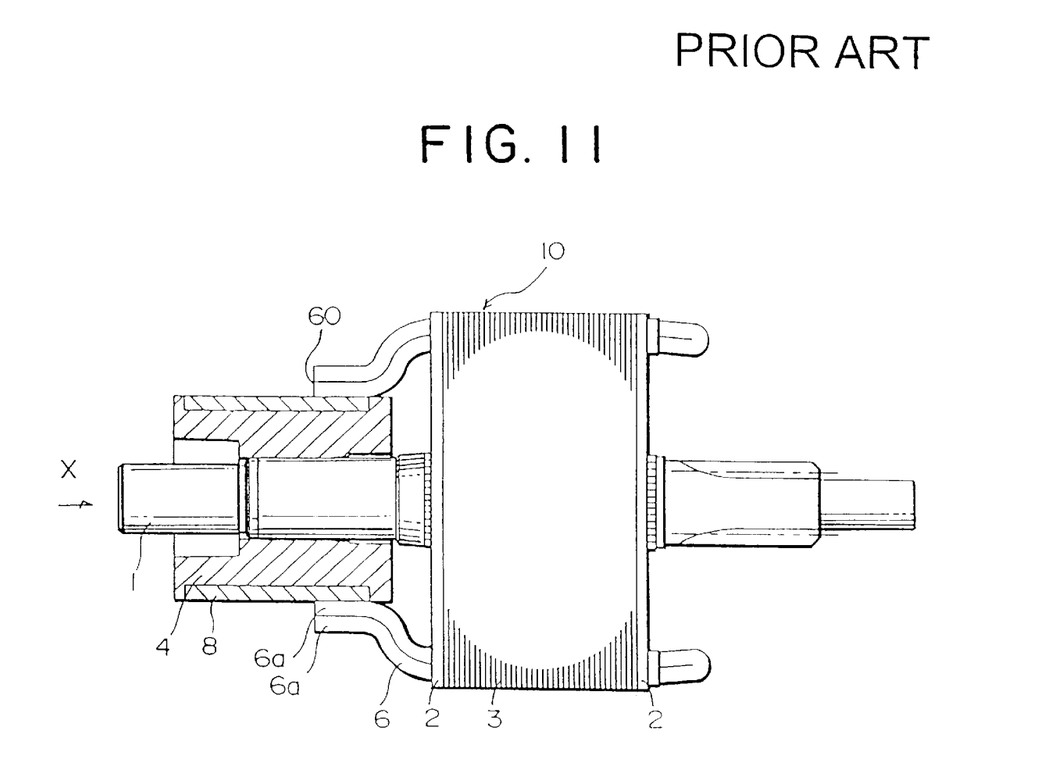
FIG. 11 is a partial sectional view of a conventional armature.
Figure 12:
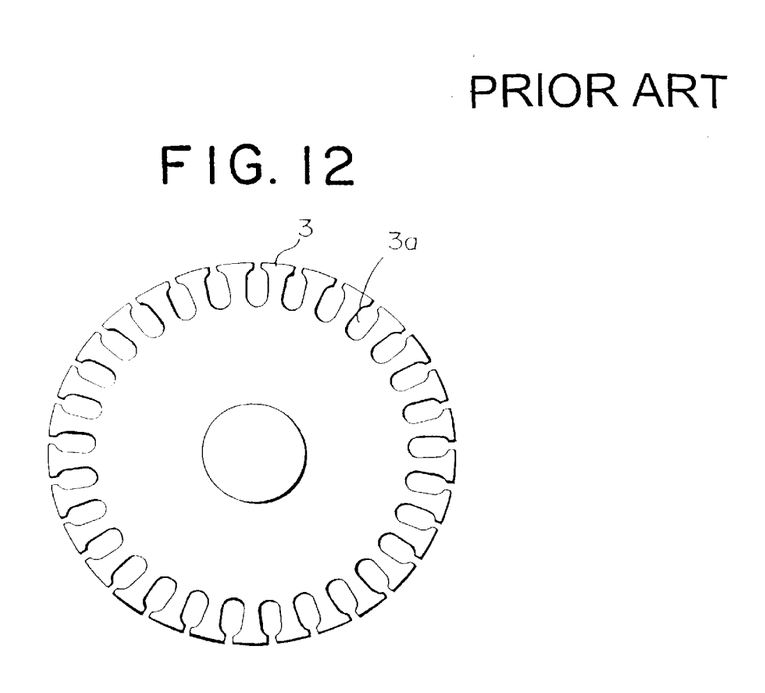
FIG. 12 is a plan view of the laminated core used in the armaure in FIG. 11.

FIG. 11 is a partial cross section showing an armature 10 employing conventional armature coil conductors. Conventionally, the end plates 2 and the laminated core (armature core) 3 are fastened by press fitting to the shaft 1. The U-shaped armature coil conductors 6 pass through the end plate 2 and laminated core 3, which have a plurality of slots 3a parallel to their circumference, as shown in FIG. 12. Also, a commutator consisting comprising segments 8 and a mold 4 fastening the commutator segments 8 are arranged parallel to the circumference of the shaft 1 and fastened thereto by press fitting.

Figure 13:
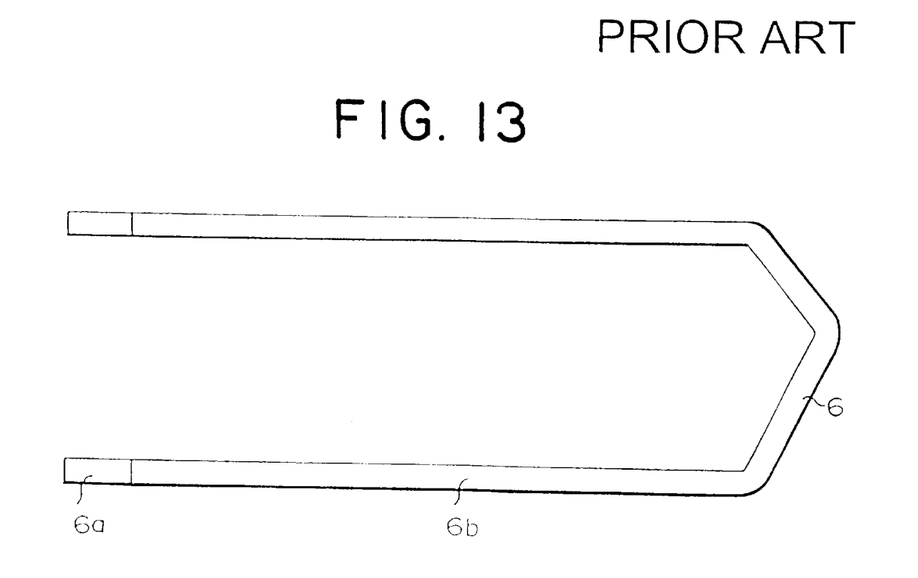
FIG. 13 is an armature coil conductor used in the armature in FIG. 11.

As shown in FIG. 13, the conventional armature coil conductor 6 has a circular cross section and consists of a conductor which has a circular cross section, is covered with an insulation coating and is formed in the shape of a U, and the insulation coating of the lead portions 6a at each end of the conductor only are removed by cutting, etc.

FIGS. 14 to 18 show the conventional method for manufacturing an armature employing the armature coil conductors.

Figure 14:
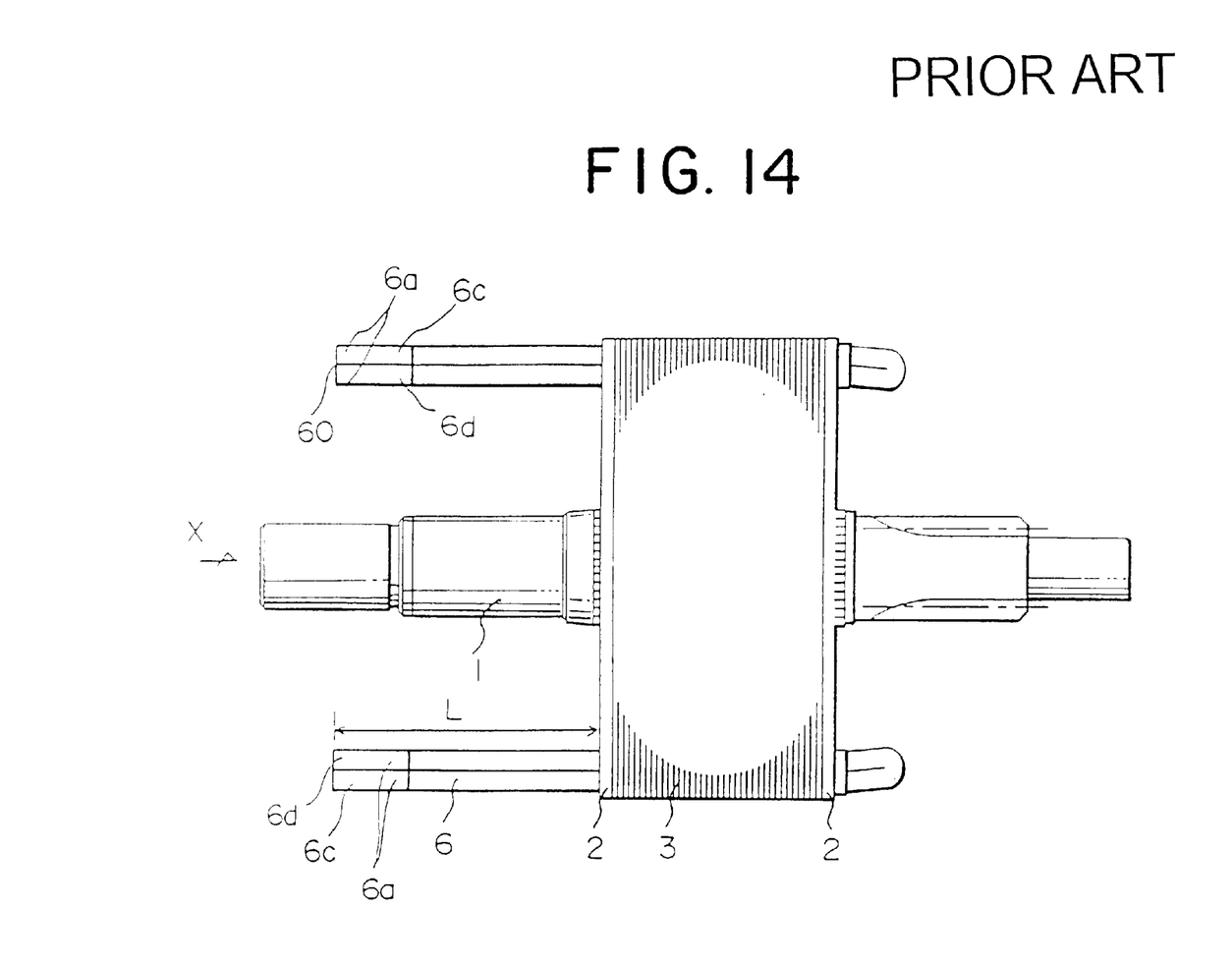
FIG. 14 is a front elevation showing the armature during manufacture.
Figure 15:
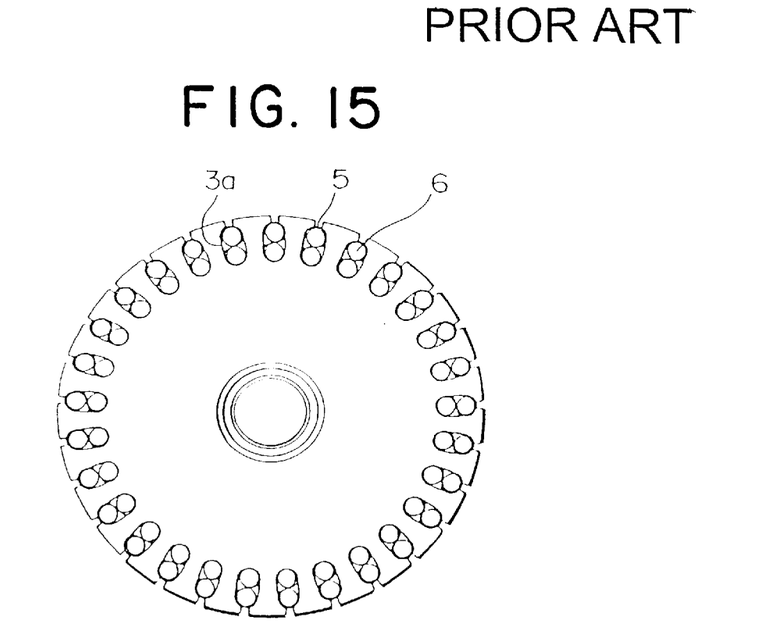
FIG. 15 is a view from X in FIG. 14.

First, end plates 2 and a laminated core 3 are fastened to a shaft 1 by press fitting as shown in FIG. 14. Armature coil conductors 6 are prepared to match the number of slots 3a, and are inserted into the slots 3a after or at the same time that insulating paper 5 is inserted, as shown in FIG. 15, which is a view from X in FIG. 14.

Figure 16:
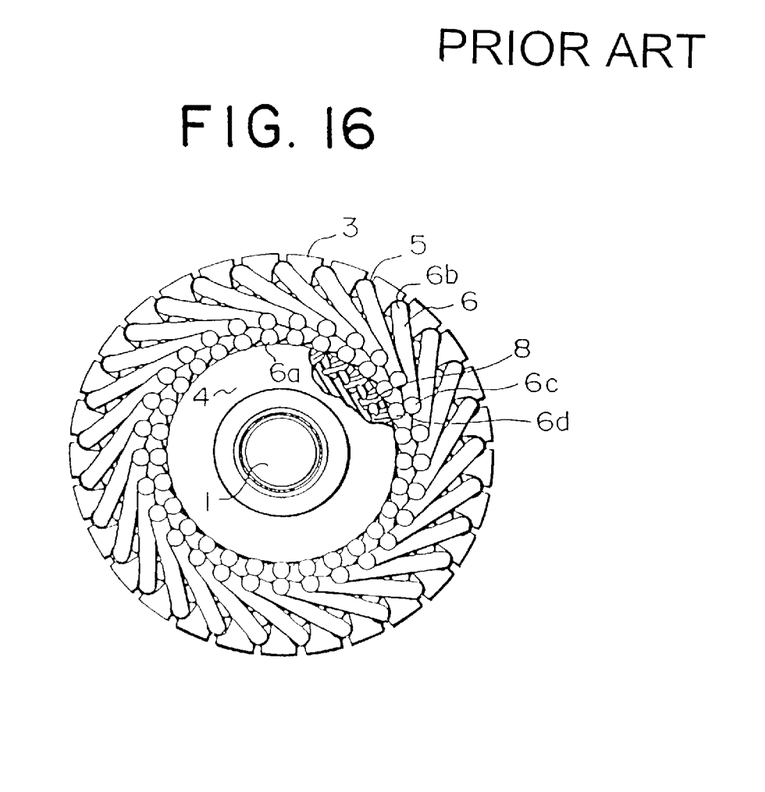
FIG. 16 is a view from X in FIG. 11.

Next, the armature coil conductors 6 are arranged in pairs and formed so that they overlap above the commutator segments 8 such that the lead portions 6a at the ends of the armature coil conductors 6 have their upper leads 6c on the outside and their lower leads 6d on the inside radially parallel to the armature as shown in FIG. 16.

Figure 17:
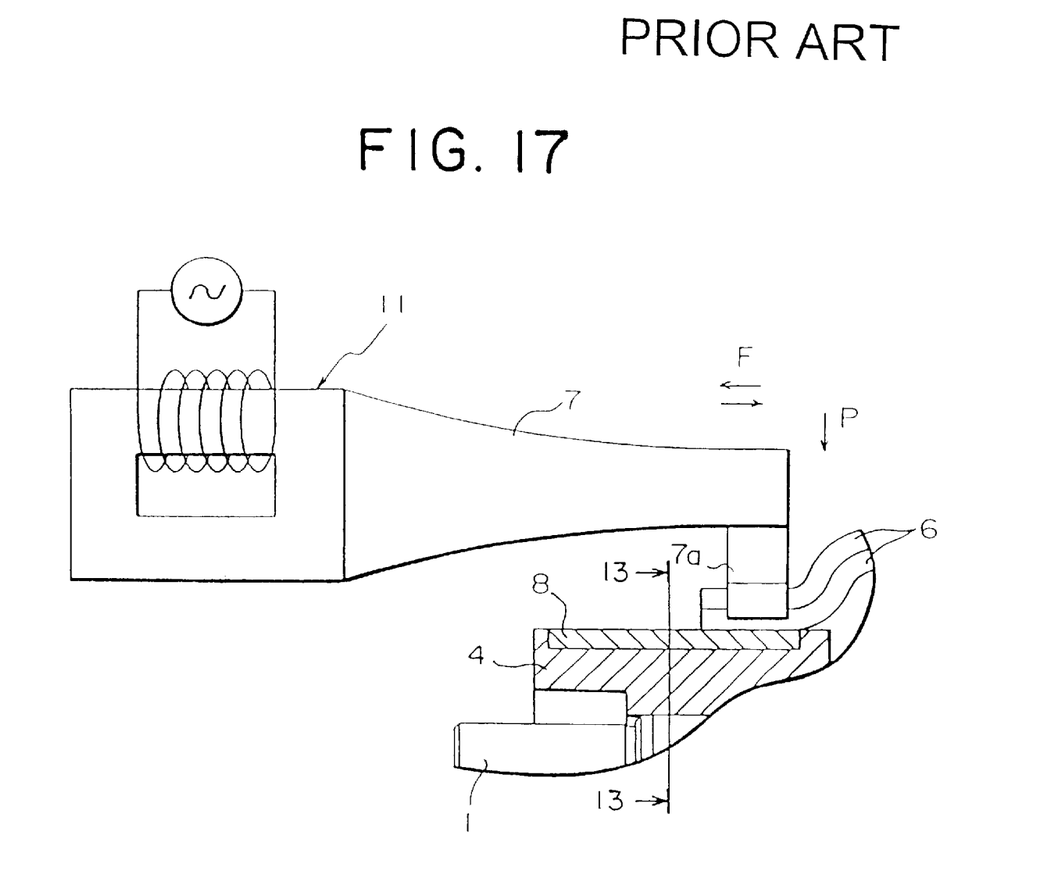
FIG. 17 is a front elevation showing the ultrasonic welding of the armature in FIG. 11.
Figure 18:
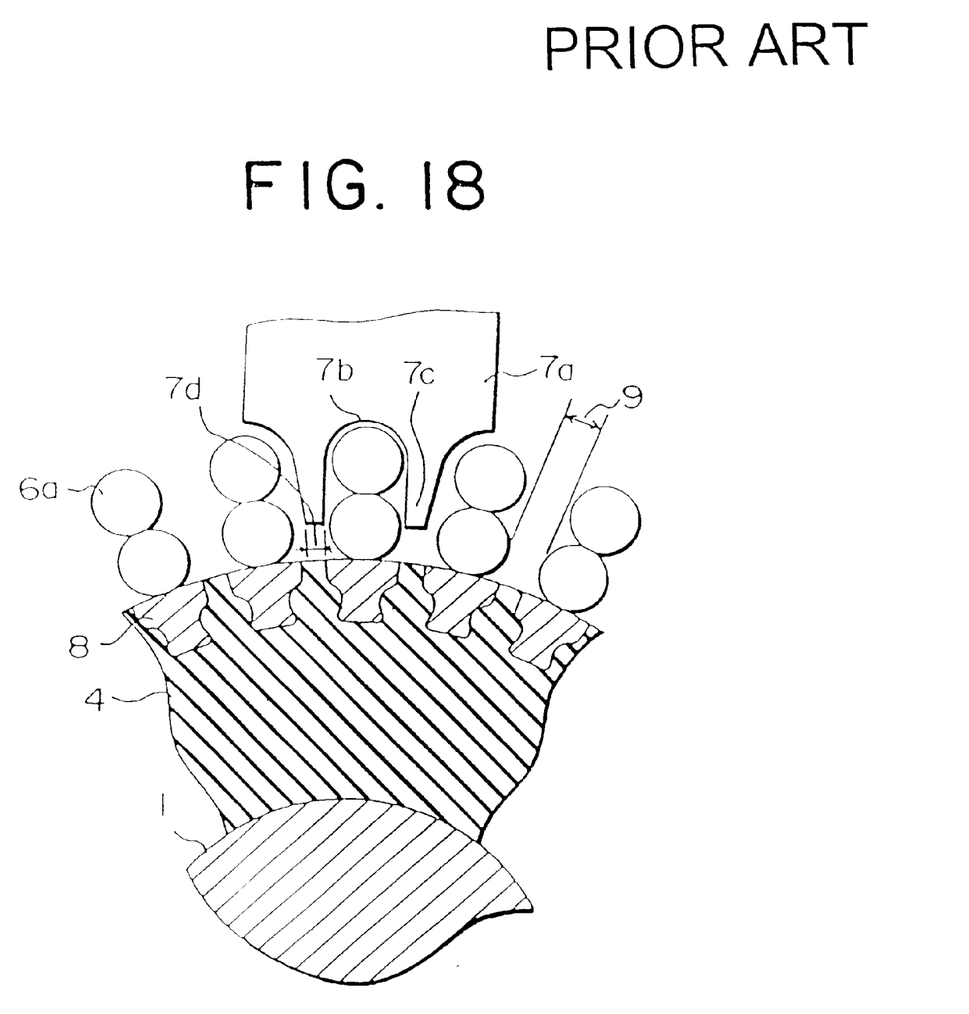
FIG. 18 is a sectional along 18—18 in FIG. 17.

As shown in FIG. 17, the lead portions 6a at the ends of the armature coil conductors 6 are welded to the commutator segments 8 using an ultrasonic welder 11. FIG. 18 is a cross section along line 18—18 in FIG. 17. As shown in FIG. 18, the end portion 7a of the horn 7 of the ultrasonic welder 11 has two protrusions 7c. Together these protrusions 7c function as a welding jig during ultrasonic welding to ensure that the lead portions 6a of the armature coil conductors 6 are welded securely to the prescribed position on the commutator segments 8, and a U-shaped groove 7b is formed between the protrusions 7c. The paired lead portions 6a of the armature coil conductors 6 fit into this U-shaped groove 7b. As shown in FIG. 17, pressure is applied to the horn 7 parallel to the arrow P so that the lead portions 6a are pressed against the commutator segment 8, and by vibrating the horn 7 parallel to the arrows F along the axis of the armature, the lead portion 6a of the upper lead 6c is welded to the lead portion 6a of the lower lead 6d, and the lead portion 6a of the lower lead 6d is welded to the commutator segment 8, connecting each electrically and forming an armature coil.

However, if the number of slots 3a in the armature is increased, or if the diameter of the armature coil conductors is enlarged to increase the cross-sectional area of the armature coil conductors 6, the lead portion spacing 9 between the lead portions 6a of adjacent armature coil conductors 6 will become narrow, as shown in FIG. 18. For that reason, it becomes necessary to make the protrusions 7c of the horn 7 thinner and reduce the protrusion with 7d of the protrusions 7c, since they must be inserted into this lead portion spacing 9 during ultrasonic welding. As the protrusions 7c become thinner, they become weaker and are unable to withstand the vibrations which arise in the horn 7 itself during ultrasonic welding, and there is a risk that the protrusions 7c will break.

SUMMARY OF THE INVENTION

Accordingly, an object of the present invention is to provide an armature coil conductor, and a method of manufacture therefor, for use in an armature coil where the lead portions of the armature coil conductor are to be connected to commutator segments by ultrasonic welding, wherein the spacing between the peripheral portions of the lead portions of adjacent armature coil conductors does not become narrow even if the number of slots in the armature is increased or the diameter of the armature coil conductors is enlarged to increase the cross-sectional area of the armature coil conductors, thus enabling a horn provided with protrusions having conventional strength and durability to be used without modification.

With the above object in view, the present invention is an armature coil conductor for a direct-current motor of circular cross section having straight portions which fit into slots in the armature core and lead portions disposed at the ends of the straight portions which are to be connected by ultrasonic welding to commutator segments arranged parallel to or parallel to the circumference of the armature, wherein the lead portions have oval cross sections such that the dimensions of the cross sections of the lead portions parallel to the circumference of the armature are smaller than the dimensions of the cross sections of the straight portions parallel to the circumference of the armature.

Preferably, the cross-sectional area of the lead portions may be the same as the cross-sectional area of the straight portions.

The present invention is an armature coil conductor of circular cross section having straight portions which fit into slots in the armature core and lead portions disposed at the ends of the straight portions which are to be connected by ultrasonic welding to commutator segments arranged parallel to the circumference of the armature, wherein the lead portions have circular cross sections such that the cross-sectional diameter of the lead portions is smaller than the cross-sectional diameter of the straight portions.

The present invention is the method of manufacture for an armature coil conductor comprising the steps of forming, in an armature coil conductor, straight portions which fit into slots in the armature core and lead portions disposed at the ends of the straight portions which are to be connected by ultrasonic welding to commutator segments arranged parallel to the circumference of the armature, and working the ends of the straight portions so that the lead portions have oval cross sections such that the dimensions of the cross sections of the lead portions parallel to the circumference of the armature are smaller than the dimensions of the cross sections of the straight portions parallel to the circumference of the armature.

Preferably, the working performed on the ends of the straight portions may be ironing.

Preferably, the working performed on the ends of the straight portions may comprise inserting a plurality of the straight portions into the slots in the armature core; overlapping a plurality of the lead portions and forming pairs of lead portions coprising an upper lead and a lower lead; and simultaneously ironing the pairs of lead portions by passing the pairs of lead portions through a die having a plurality of die holes capable of ironing the pairs of lead portions simultaneously.

BRIEF DESCRIPTION OF THE DRAWINGS

The present invention will become more readily apparent from the following details description of the preferred embodiments of the present invention taken in conjection with the accompanying drawings,in which.

DESCRIPTION OF THE PREFERRED EMBODIMENTS

A method of manufacture for an armature coil conductor which is an embodiment of the present invention is shown in FIGS. 1 to 5. In FIG. 14, the end plates 2 and the laminated core (armature core) 3 are fastened to the shaft 1 by press fitting, and, as shown in FIG. 15, which is a view from X in FIG. 14, the armature coil conductors 6 are prepared to match the number of the slots 3a, and are inserted into the slots 3a after or at the same time that insulating paper 5 is inserted, which is the same as the conventional example up to this point and so further explanation will be omitted.

In the state illustrated in FIG. 14, the portions L of each of the armature coil conductors 6 passing through the laminated core 3 are straight. Also, the lead portions 6a of the portions shown as L of any two armature coil conductors 6 passing through the same slot 3a overlap and form a pair of lead portions 60 with an upper lead 6c and a lower lead 6d.

Figure 1:
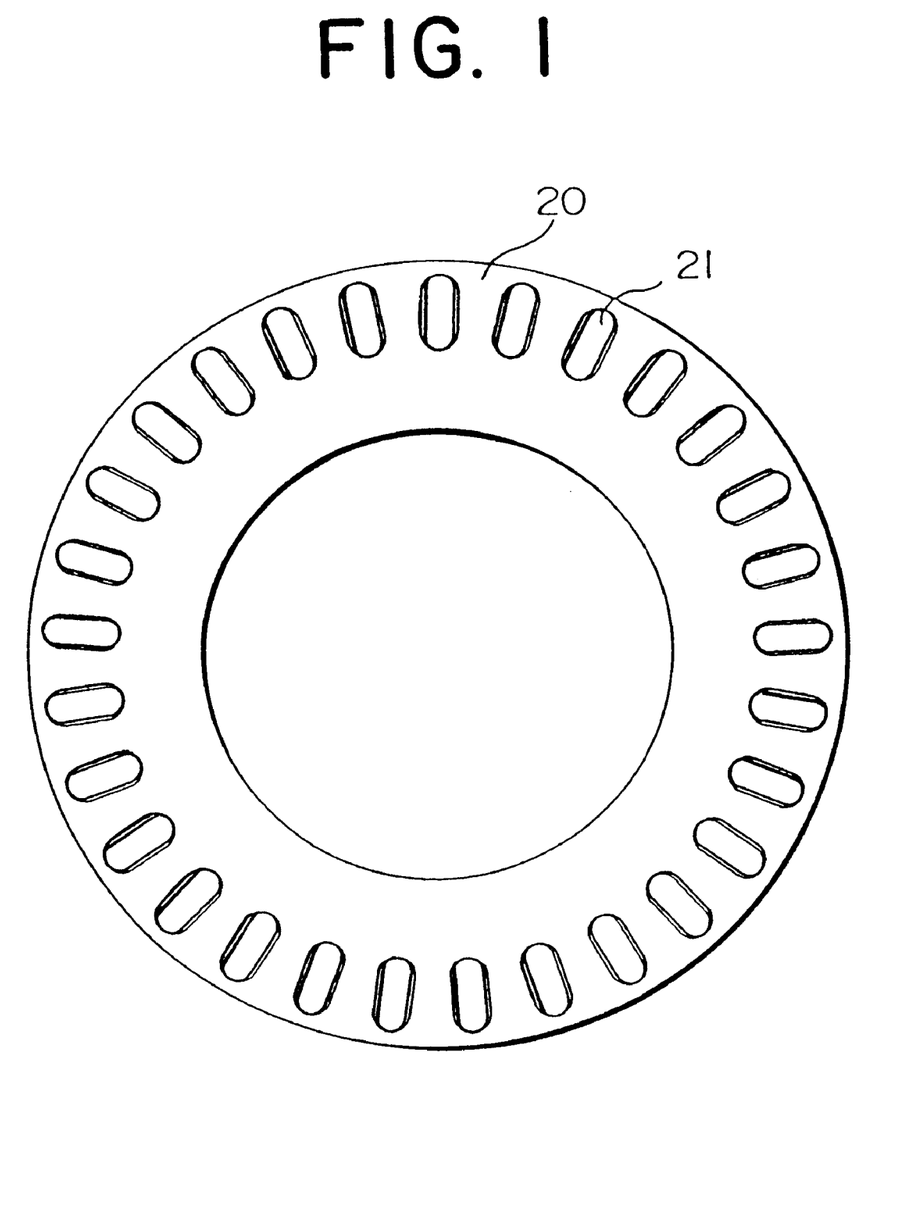
FIG. 1 is a plan view showing the die used in the first embodiment of the present invention.
Figure 2:
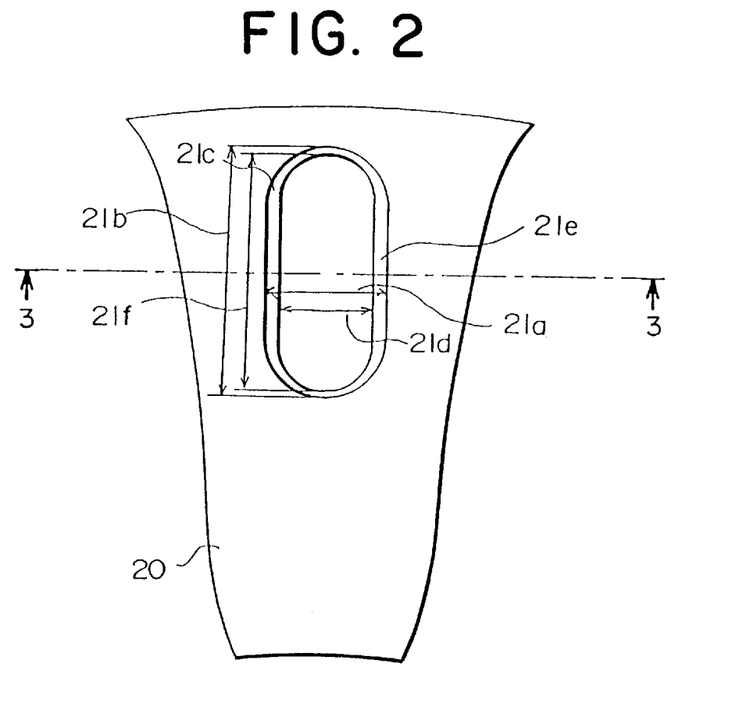
FIG. 2 is an expanded sectional view of a hole portion of the die in FIG. 1.
Figure 3:
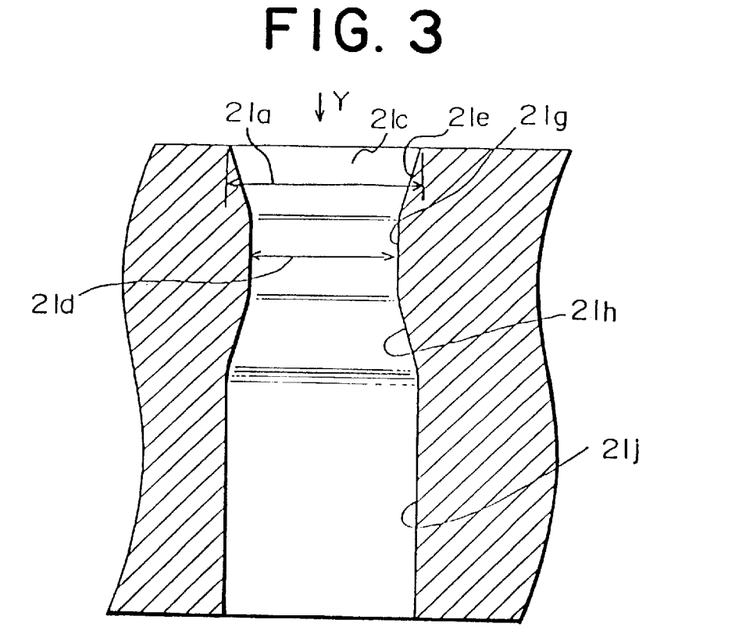
FIG. 3 is a sectional view along 3—3 in FIG. 2.

FIG. 1 shows a die 20 for forming the lead portions 6a of armature coil conductors 6 into ovals by ironing. In the diagram, die holes 21, into which the pairs of lead portions 60 of armature coil conductors are inserted, are disposed along the circumference of a disc-shaped die 20 of prescribed thickness so as to correspond to the number of pairs of lead portions 60 of the armature coil conductors. Each die hole 21 is a slot whose two straight edges are parallel to a radius of the die 20, each of the two straight edges of which describes a smooth arc with its neighbor, and the die holes 21 are disposed in positions corresponding to the armature coil conductors 6 inserted in the slots 3a as shown in FIG. 14. FIG. 2 shows an enlarged view of a die hole 21. FIG. 3 shows a cross section along line 3—3 in FIG. 2, which is a section cut perpendicular to the radius of the die 20.

In FIGS. 2 and 3, the entrance 21c to the die hole 21 is a lead-in portion for the armature coil conductors 6 to guide the armature coil conductors 6 into the die hole 21 from the direction of the arrow Y to perform ironing or drawing, and the entrance 21c has a tapered portion 21e, whose mouth decreases in area towards the interior of the die hole 21. The width 21a and height 21b of the mouth portion of the die hole 21 within the entrance 21c are formed larger than the width and height, respectively, of the pair of lead portions 60 of the armature coil conductors 6 before ironing, that is, larger than the radius of the armature coil conductors 6 and twice the radius of the armature coil conductors 6, respectively.

The width 21d of the mouth portion of the die hole 21 at the narrowest portion 21g, is narrower than the radius of the armature coil conductors 6, and in anticipation that the cross section of the lead portions 60 will become slightly larger after ironing due to springback, the width 21d is slightly narrower than the cross section actually desired by ironing.

In contrast, the height 21f of the die hole 21 at the narrowest portion 21g is formed slightly larger than the height of the pair of lead portions, which is the combined height of an upper lead and a lower lead of two armature coil conductors 6 before ironing, because the excess metal from the armature coil conductors 6 due to ironing moves parallel to the height of the die hole 21. Also, a tapered portion 21h, which gradually spreads out from the narrowest portion 21g, and a parallel portion 21j are formed in the mouth portion beyond the narrowest portion 21g on the side opposite to the entrance 21c.

Also, the inside surface of the tapered portion 21e and the narrowest portion 21g of each of the die holes 21 of the die 20 has a hardness greater than that of the armature coil conductors 6.

Figure 4A:
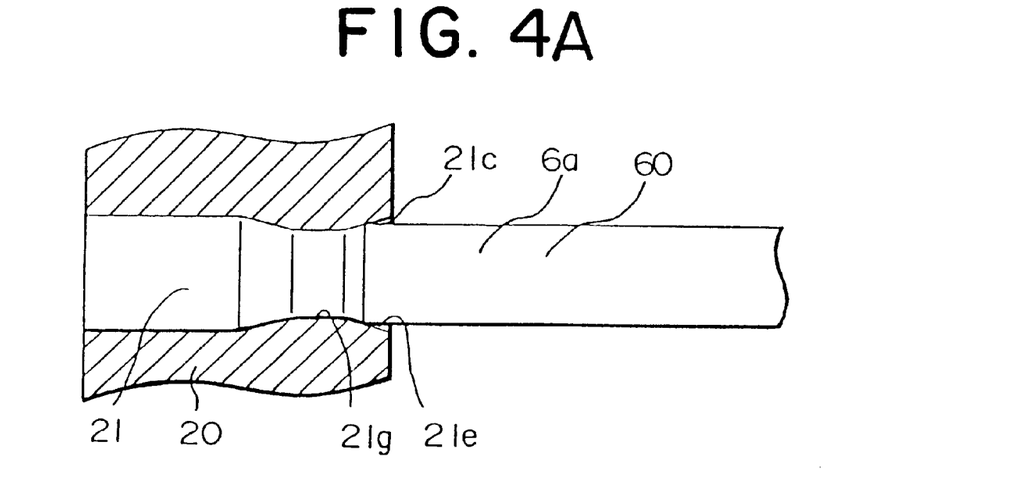
FIG. 4A is a sectional view showing the method of forming the lead portions of armature coil conductors according to the first embodiment of the present invention.

Next, the process of ironing is shown in FIG. 4A.

A pair of lead portions 60 of armature coil conductors 6 of an armature assembled to the state shown in FIG. 14 is inserted into each die hole 21 from the entrance 21c.

Figure 4B:
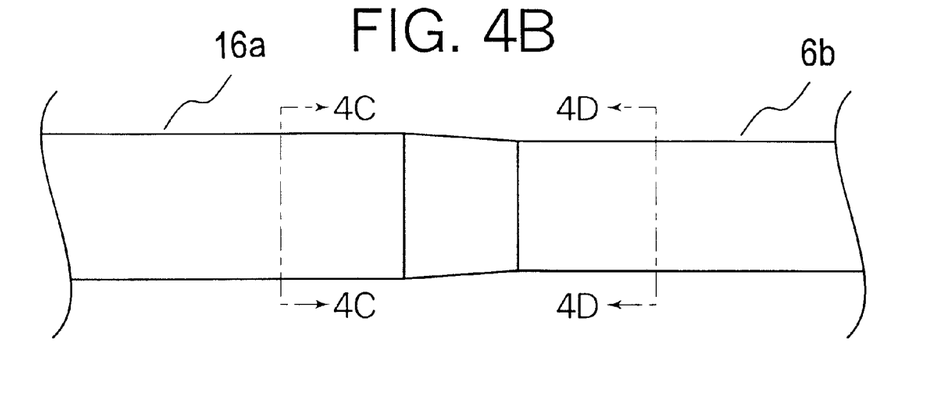
FIGS. 4B–4D illustrate a coil conductor with lead portions, and sectional views taken along the coil conductor.
Figure 4C:
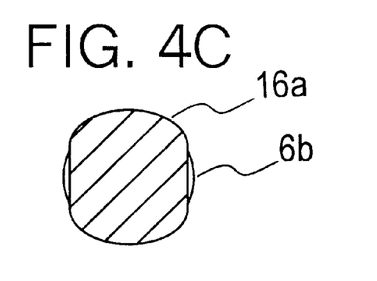
Figure 4D:
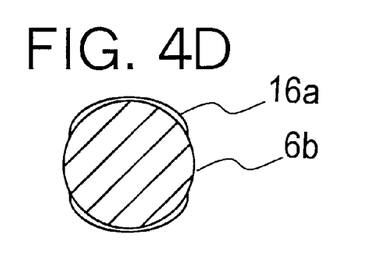
Figure 5:
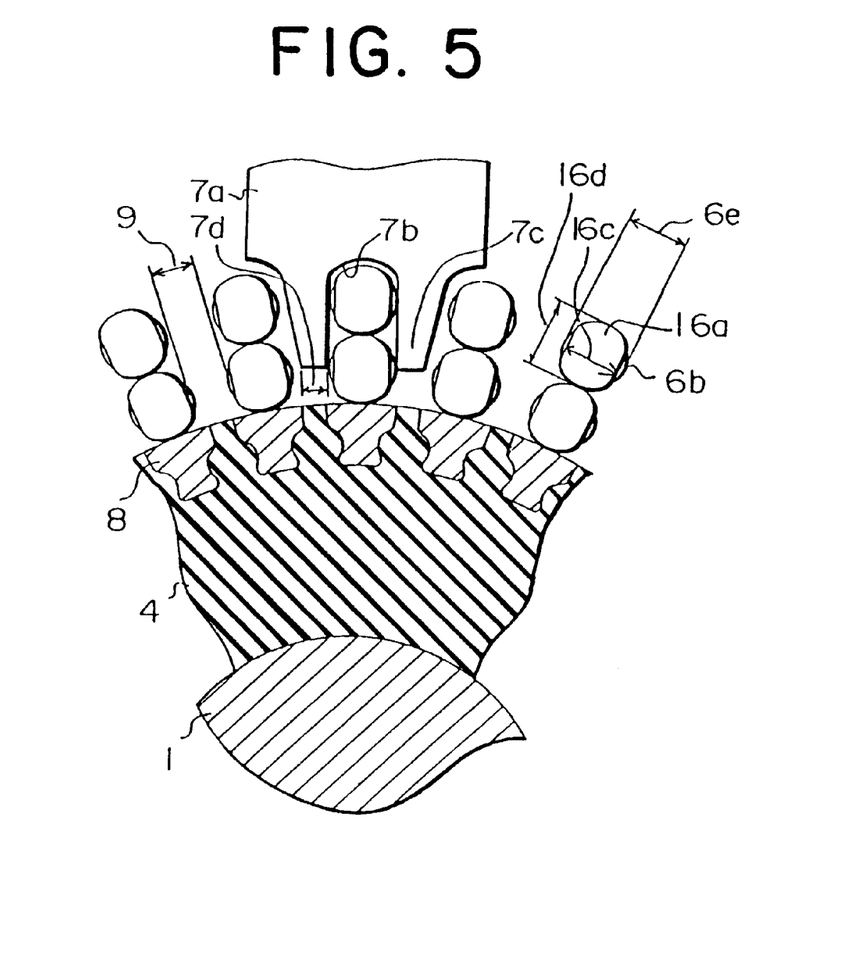
FIG. 5 is a partial sectional view showing the ultrasonic welding of the first embodiment armature coil conductors of the present invention and commutator segments.

Because the inside surface of the tapered portion 21e and the narrowest portion 21g of each of the die holes 21 of the die 20 is harder than the armature coil conductors 6, the lead portions 6a of the armature coil conductors 6 conform to the shape of the die hole 21 and the excess metal from the armature coil conductors 6 moves parallel to the height of the die hole 21, forming an oval shape. After ironing, the lead portions 6a have undergone plastic deformation so that their cross sections are oval instead of circular. In other words, the lead portions 6a of the armature coil conductors 6, which have circular cross sections, are deformed by ironing into oval lead portions 16a, which are lead portions with oval cross sections, as shown in FIG. 5. Also, although there is some plastic deformation parallel to the axis of the armature coil conductors 6, the cross-sectional area of the lead portions is the same before and after ironing as illustrated in FIGS. 4B–4D.

FIG. 5 shows the process of ultrasonic welding of the armature coil conductors 6 and the commutator segments 8.

In the figure, each oval lead portion 16a of the armature coil conductors 6 has an oval cross section due to plastic deformation resulting from ironing, such that the dimensions parallel to the circumference of the armature 16c of the cross sections of the oval lead portions 16a are smaller than the dimensions parallel to the circumference of the armature 6e of the straight portions 6b of the armature coil conductors 6, and the dimensions 16d of the cross sections of the oval lead portions 16a parallel to the radius of the armature are larger than the dimensions 6e of the circular cross sections of the straight portions 6b of the armature coil conductors 6 parallel to the radius of the armature.

The armature coil conductors 6 with oval lead portions 16a are formed such that the lead portions 60 may be positioned to come into contact with the commutator segments by a conventional process.

Next, employing a conventional process, the oval lead portions 16a of the armature coil conductors 6 are welded to the commutator segments 8 using an ultrasonic welder 11. The end portion 7a of the horn 7 of the ultrasonic welder 11 has two protrusions 7c. Together these protrusions 7c function as a welding jig during ultrasonic welding to ensure that the lead portions 6a of the armature coil conductors 6 are welded securely to the prescribed position on the commutator segments 8, and a U-shaped groove 7b is formed between the protrusions 7c. A pair of lead portions 60, made up of a pair of oval lead portions 16a of the armature coil conductors 6, fit into this U-shaped groove 7b. In this case, the dimensions 16c of the cross sections of the oval lead portions 16a parallel to the circumference of the armature are smaller than the dimensions 6e of the circular cross sections of the straight portions 6b of the armature coil conductors 6 parallel to the circumference of the armature.

Consequently, the lead portion spacing 9 does not become narrow even if the number of slots is increased or the diameter of the armature coil conductors is increased and it is not necessary to make the protrusions 7c thinner.

Figure 6:
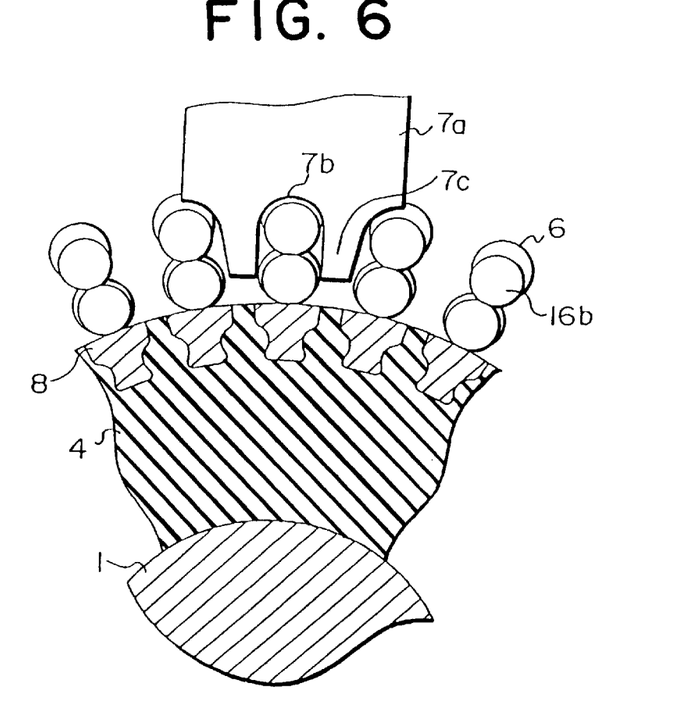
FIG. 6 is a partial sectional view showing the ultrasonic welding of the second to fourth embodiment armature coil conductors of the present invention and commutator segments.
Figure 7:
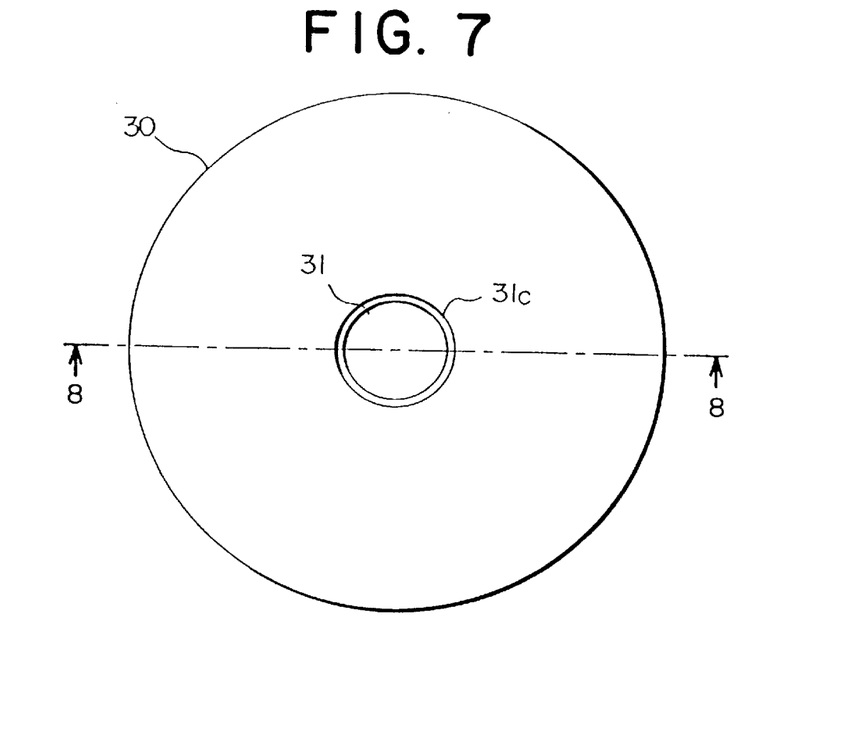
FIG. 7 is a plan view showing the die used in the second embodiment of the present invention.
Figure 8:
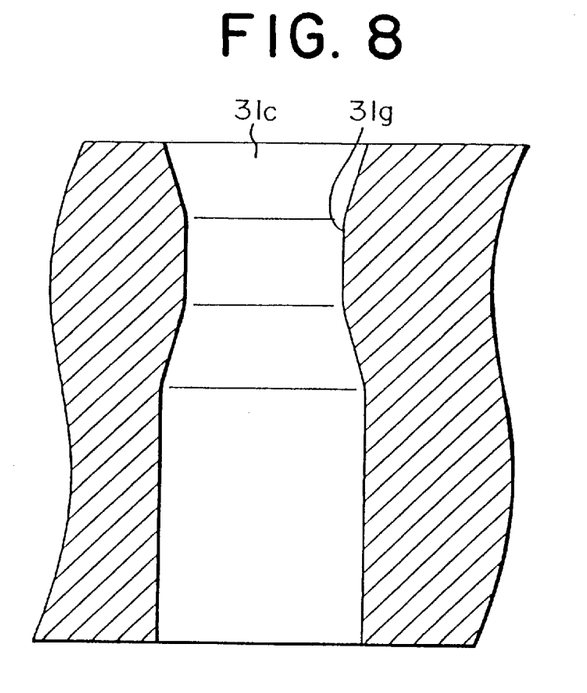
FIG. 8 is a sectional view along 13—13 in FIG. 7.

A second embodiment of the present invention is shown in FIGS. 6 to 8. In FIG. 6, the lead portions 16b of the armature coil conductors 6 are formed so as to have circular cross sections of smaller diameter than the straight portions 6b of the armature coil conductors 6.

A method of manufacture for these armature coil conductors 6 is shown in FIGS. 7 and 8.

FIG. 7 shows a circular die 30 having a single circular die hole 31 in its center for the purpose of forming the lead portions 6a of the armature coil conductors 6. The first embodiment was die 20 for forming all of the armature coil conductors 6 simultaneously, but die 30 of the present embodiment is for forming each of the armature coil conductors 6 by ironing them one at a time. FIG. 8 is a cross section along line 3—3 in FIG. 7, and the only difference from the first embodiment is that the cross sections of the entrance 31c and the narrowest portion 31g of the die hole 31 are circular, and so further explanation will be omitted.

Furthermore, when the armature coil conductors 6 are inserted into the die 30, the armature coil conductors 6 may either be in a straight form before being formed into the U shape shown in FIG. 13, or in the U-shaped form.

Figure 9:
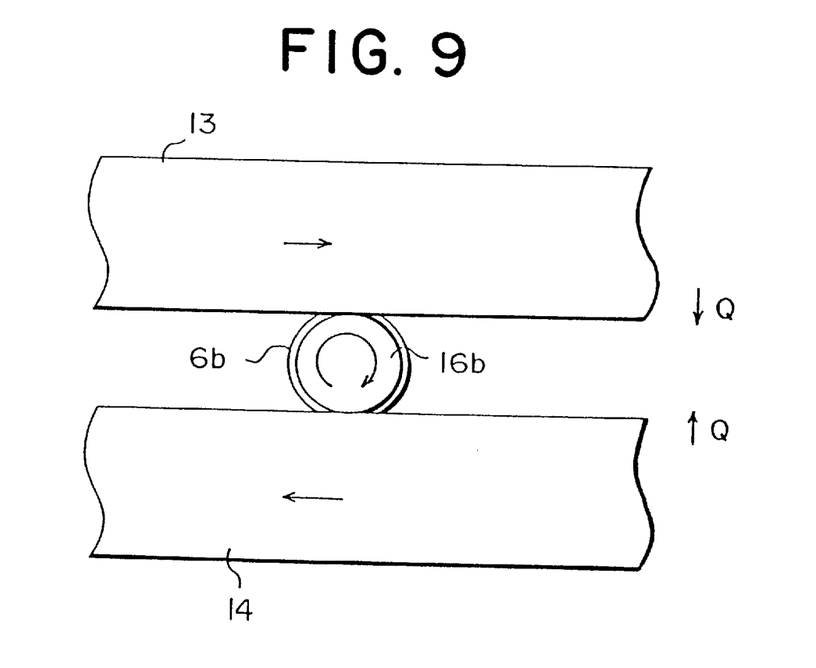
FIG. 9 is a view showing the method of forming the lead portions of armature coil conductors according to the third embodiment of the present invention.

A third embodiment of the present invention is shown in FIGS. 6 and 9. In FIG. 6, the lead portions 16b of the armature coil conductors are formed so as to have circular cross sections of smaller diameter than the straight portions 6b of the armature coil conductors, which is the same as the second embodiment, but the method of manufacture for the armature coil conductors is different from that of the second embodiment.

As shown in FIG. 9, an upper die 13 and a lower die 14 are prepared and arranged so that their spacing becomes less than the diameter of the straight portions 6b of an armature coil conductor after insertion of the armature coil conductor 6. A lead portion 6a of an armature coil conductor 6 is inserted between the upper die 13 and the lower die 14 while the armature coil conductor 6 is still in its straight form before being formed into the U shape shown in FIG. 13. By application of pressure to the upper die 13 and lower die 14 parallel to the arrows Q and reciprocation of the upper die 13 and lower die 14 in mutually opposite directions to the left and right, the lead portion 6a of the armature coil conductor 6 is rolled and undergoes plastic deformation. Thus, the lead portion 6a of the armature coil conductor 6 is formed so as to have a circular cross section of smaller diameter than the straight portion 6b of the armature coil conductor, and becomes a circular lead portion 16b.

Figure 10:
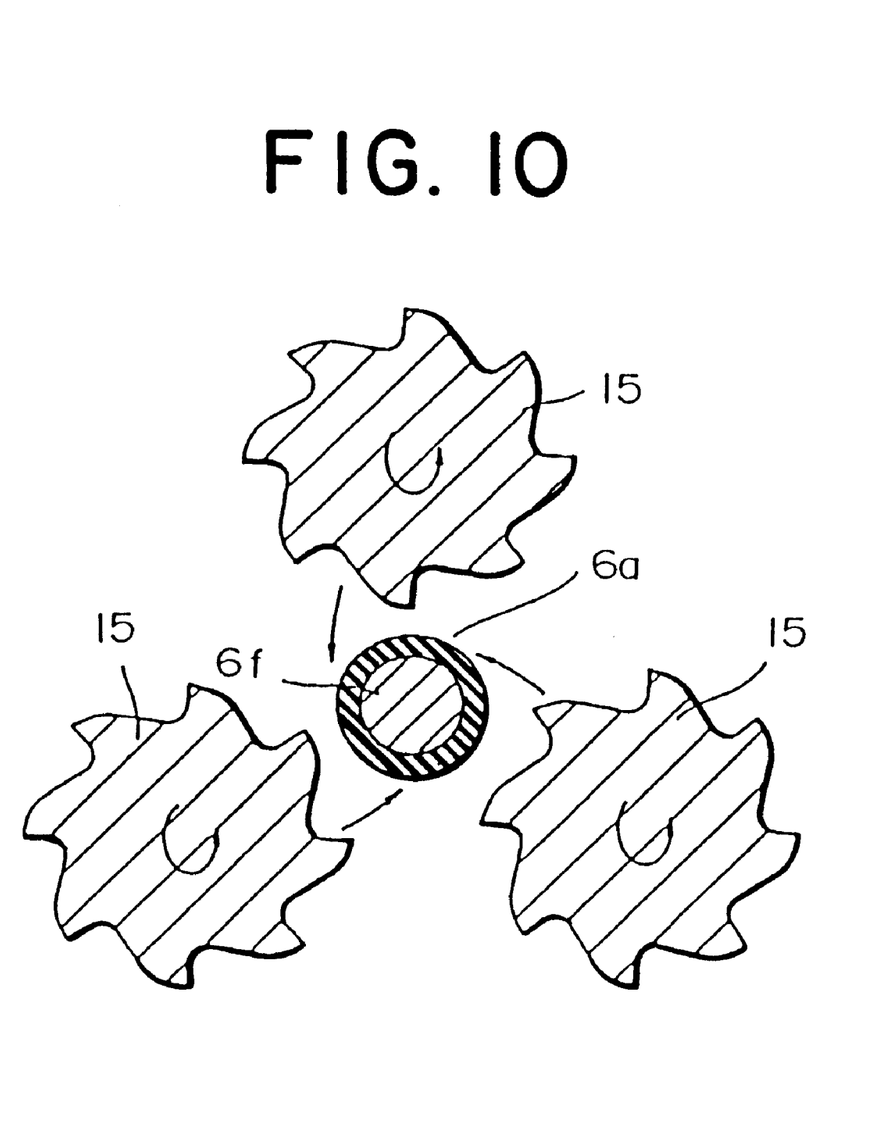
FIG. 10 is a view showing the method of forming the lead portions of armature coil conductors according to the fourth embodiment of the present invention.

A fourth embodiment of the present invention is shown in FIGS. 6 and 10. In FIG. 6, the lead portions 16b of the armature coil conductors 6 are formed so as to have circular cross sections of smaller diameter than the straight portions 6b of the armature coil conductors, which is the same as the second and third embodiments, but the method of manufacture for the armature coil conductors is different from that of the second and third embodiments.

As shown in FIG. 10, cutters 15 are disposed at intervals of 120 degrees parallel to the circumference of a cutting machine which is not shown. An armature coil conductor 6 is prepared which is covered on the outside by an insulation coating 6e including the extremities of both ends thereof. One of the ends of the armature coil conductor 6 which are to become lead portions 6a of the armature coil conductor 6 is placed in the center of the three cutters.

In order to connect the lead portion 6a of an armature coil conductor 6 to a commutator segment 8 electrically and mechanically by ultrasonic welding, the insulation coating 6g is removed by a cutting process, etc., but in the present embodiment, part of the conductor portion 6f of the armature coil conductor 6 is simultaneously cut away when the insulation coating 6g is removed by the cutting process by increasing the depth of the cut, and the lead portion 6a is formed so as to have a circular cross section of smaller diameter than the straight portion 6b of the armature coil conductor.

In the cutting process, each of the cutters 15 rotates independently as it revolves and cuts the insulation coating 6g. During this process, the depth of the cut is adjusted to more than just that required to completely remove the insulation coating 6g, and part of the conductor portion 6f of the armature coil conductor 6 is also cut away. In this way, the lead portion 16b of the armature coil conductors 6 is formed so as to have a circular cross section of smaller diameter than the straight portion 6b of the armature coil conductor.

In the present inventions, an armature coil conductor in which the lead portions are to be connected to commutator segments by ultrasonic welding is provided, wherein the spacing between the circumferences of the lead portions of adjacent armature coil conductors does not become narrow even if the number of slots in the armature is increased or the diameter of the armature coil conductors is enlarged to increase the cross-sectional area of the armature coil conductors, thus enabling a horn provided with protrusions having conventional strength and durability to be used without modification.

In the present inventions according to either claim 5, the lead portions of an armature coil conductor are formed by ironing, thus enabling the lead portions to be formed with oval or circular cross sections in a short time.

In the present invention according to claim 6, all of the lead portions of an armature coil conductor for use in an armature are formed simultaneously by ironing, thus enabling the lead portions to be formed in even shorter time.

What is claimed is:

1. An armature coil conductor for a direct-current motor having straight portions which fit into slots in an armature core and corresponding lead portions, disposed at ends of said straight portions, which are to be connected by ultrasonic welding to commutator segments arranged parallel to a circumference of an armature core, characterized in that said lead portions have oval cross sections such that dimensions of the oval cross sections of said lead portions parallel to the circumference of the armature are smaller than dimensions of cross sections of said corresponding straight portions parallel to the circumference of said armature.

2. The armature coil conductor according to claim 1, characterized in that a cross-sectional area of each of said lead portions is substantially equal to a cross-sectional area of each of said corresponding straight portions.

3. The armature coil conductor according to claim 1, characterized in that one of said cross sections of said straight portions is circular.

4. The armature coil conductor according to claim 1, wherein each of said straight portions has a circular cross section.

5. A motor comprising:

an armature core;

a rotating shaft which rotates about a central axis;

a commutator segment; and an armature coil conductor having a first portion which is connected to said commutator segment and a second portion which is connected to said armature core;

wherein a first cross section of said first portion, made in a first plane perpendicular to the central axis, has a first dimension taken in a radial direction of said armature which is larger than a second dimension of the first cross section taken in a direction perpendicular to the first dimension; and wherein a second cross section of said second portion, made in a second plane perpendicular to the central axis, has a corresponding third dimension taken in a direction perpendicular to the radial direction of said armature which is larger than the second dimension.

6. The motor according to claim 5, characterized in that a cross-sectional area of said first portion in the first plane is substantially equal to a cross-sectional area of said second portion in the second plane.

7. The motor according to claim 5, characterized in that said first portion has an oval cross-section.

8. The motor according to claim 7, characterized in that said second portion has a circular cross-section.

9. The motor according to claim 7, characterized in that said motor is a DC motor.

10. The motor according to claim 5, characterized in that said second dimension is a maximum dimension of the first cross section taken in the direction perpendicular to said first dimension.

11. The motor according to claim 10, characterized in that said third dimension is a maximum dimension of the second cross section taken in a direction perpendicular to the radial direction of said armature.

12. A motor comprising:

an armature core;

a rotating shaft which rotates about a central axis;

a commutator segment; and an armature coil conductor having a first portion which is connected to said commutator segment and a second portion which is connected to said armature core; and wherein a maximum dimension of a cross section of said first portion, made in a first plane perpendicular to the central axis, is larger than a maximum dimension of a cross section of said second portion made in a second plane perpendicular to the central axis.

13. The motor according to claim 12, characterized in that a cross-sectional area of said first portion in the first plane is substantially equal to a cross-sectional area of said second portion in the second plane.

14. The motor according to claim 12, characterized in that said first portion has an oval cross-section.

15. The motor according to claim 14, characterized in that said second portion has a circular cross-section.

16. The motor according to claim 14, characterized in that said motor is a DC motor.

17. The motor according to claim 12, wherein a maximum dimension of the cross section of said first portion, made in the first plane perpendicular to the central axis and taken in a direction perpendicular to a radial direction of said armature, is smaller than a maximum dimension of the cross section of said second portion made in the second plane perpendicular to the central axis and taken in the direction perpendicular to the radial direction of said armature.

* * * * *